United States Patent [19]
Akamatsu et al.

[11] Patent Number: 5,646,511
[45] Date of Patent: Jul. 8, 1997

[54] POWER SYSTEM COMPENSATOR APPARATUS AND POWER CONVERTER APPARATUS

[75] Inventors: Masahiko Akamatsu; Shotaro Murakami; Yasuhiko Hosokawa, all of Tokyo, Japan

[73] Assignee: Mitsubishi Denki Kabushiki Kaisha, Tokyo, Japan

[21] Appl. No.: 552,521

[22] Filed: Nov. 2, 1995

[30] Foreign Application Priority Data

May 29, 1995 [JP] Japan ..................... 7-130702

[51] Int. Cl.$^6$ .................................................. H02J 3/06
[52] U.S. Cl. ............................................................ 323/207
[58] Field of Search .......................... 307/66, 45, 87; 323/207

[56] References Cited

U.S. PATENT DOCUMENTS

| | | | |
|---|---|---|---|
| 5,198,746 | 3/1993 | Gyugyi et al. | 323/207 |
| 5,309,346 | 5/1994 | Gyugyi | 363/54 |
| 5,343,139 | 8/1994 | Gyugyi et al. | 323/207 |
| 5,400,240 | 3/1995 | Araki | 363/97 |
| 5,422,518 | 6/1995 | Sashida | 307/75 |

FOREIGN PATENT DOCUMENTS

| | | |
|---|---|---|
| 54-152141 | 11/1979 | Japan . |
| 55-140918 | 4/1980 | Japan . |
| 55-141932 | 6/1980 | Japan . |
| 55-56425 | 11/1980 | Japan . |

OTHER PUBLICATIONS

Einar Larsen, et al., "Benefits of GTO–Based Compensation Systems for Electric Utility Applications"; GE Industrial and Power Systems; pp. 1–8, 1991 IEEE.

Shosuke Mori, et al., "Development of a Large Static VAR Generator Using Self–Commutated Inverters for Improving Power System Stability"; The Kansai Electric Power Co., Inc.; pp. 1–7; 1992 IEEE.

*Primary Examiner*—Aditya Krishnan
*Attorney, Agent, or Firm*—Leydig, Voit & Mayer

[57] ABSTRACT

A power system compensator apparatus comprising a power converter unit that works in series with the transmission of a power system and switching control means for controlling the link voltage ($V_{LINK}$) of the non-power system side. The switching control means controls the phase of, at least, the fundamental frequency of the power system. The power converter unit contains a static power converter transformer with phase differences taking place the secondary windings of the power converter unit. The static power converter unit is operated in non-PWM or fixed pulse width ratio. Switching rate is minimized. Loss is lowered while economy of operation is improved. Since the voltage that works in series with the power transmission line is controlled, direct compensation of system reactance voltage and direct control of line current are performed. Improved performance thus results.

7 Claims, 3 Drawing Sheets

POWER SYSTEM COMPENSATOR APPARATUS AND POWER CONVERTER APPARATUS

BACKGROUND OF THE INVENTION

1. Field of the Invention

The present invention relates to a power system compensator apparatus, and power converter apparatus and, more particularly, to a power system compensator apparatus and power converter apparatus employing a static power converter.

2. Description of the Related Art

FIG. 3 is an example of the construction of the known static power system compensator apparatus. As illustrated in FIG. 3, the apparatus comprises a transmission system 1, a receiving system 2, buses or bus-lines 3a and 3b, a transmission line TL 30, a main transformer 4, a transformer for use in a power converter (multi-transformer) 5, primary and secondary windings 5a and 5b of the transformer 5, and a converter 6 such as an inverter. The converter 6 is composed of per phase converters 6a, 6b and 6c and a link capacitor 7. Reference number 8 designates pulse-width modulation (PWM) control means for controlling the converter 6. The PWM control means 8 is constructed of a PWM control unit 8a, a current control unit 8b for controlling active current Ip and reactive current Iq, and an operational unit 8c for computing active current Ip and reactive current Iq. The apparatus further comprises link voltage pickup means 9 for picking up and detecting a link voltage $V_{LINK}$, a link voltage control unit 10 for controlling the link voltage $V_{LINK}$, current pickup means 11 for picking up and detecting a line current $I_L$ and for outputting it to the operational unit 8c, AC voltage pickup means 22 for picking up and detecting an alternating current voltage $V_{TL}$, absolute value pickup means 23 including of a rectifier and other components for picking up and then outputting the amplitude or absolute value of the AC voltage $V_{TL}$, and a control unit 28 for controlling the amplitude of the line voltage Vac or reactive power Q output by the absolute value pickup means 23.

In FIG. 3, the converter 6 is a PWM inverter, which is controlled by a PWM control signal provided by the PWM control unit 8a. The PWM control unit 8a comprises a PWM modulator that generates the PWM control signal based on three phase instantaneous voltage command waveforms Vu,v,w (modulating waves). The instantaneous voltage command waveforms Vu, v, w are given as the output of the current control unit 8b that controls the active current Ip and reactive current Iq. The current control unit 8b receives a reactive current command I*q from the control unit 28 that controls the line voltage Vac or the reactive power Q. The current control unit 8b also receives an active current command I*p from the link voltage control unit 10 that controls the link voltage $V_{LINK}$. In this known static power system compensator apparatus, the transformer 5 for use in a power converter is not provided with phase-shifting transforming function, thus, the transformer 5 gives PWM voltages in the secondary winding 5b independently and at different times.

In the known compensator apparatus, the input and output of the active current Ip, therefore, the active power P is controlled so that the DC link voltage $V_{LINK}$ is constant. Under the condition of the constant $V_{LINK}$, the AC output voltage, reactive current Iq and reactive power Q of the converter 6 are controlled through a PWM technique (pulse-width modulation technique). Namely, control is performed by changing the amplitude (or the magnitude of the instantaneous waveform) of the modulating wave in PWM. This increases the switching frequency of the converter 6, causing both switching loss and snubber loss to increase, and consequently lowering the efficiency of the apparatus. An increase in the switching frequency requires the recovery of snubber energy if a heavy-duty GTO converter is used as the converter 6. This complicates the design of the apparatus and thereby lowers the reliability of the apparatus. When a pulse-width modulated voltage is applied to the transformer 5, an increased transformer loss results. In addition to the switching loss and snubber loss, the transformer loss lowers the efficiency even further.

In the known compensator apparatus, the transformer 5 is not of the phase-shifting transformer type. Thus, if PWM phase-shifting is attempted in the PWM inverter, which constitutes the converter 6, to lower the level of harmonics, the phase difference appears in the fundamental wave voltage. Since the same phase current (in-phase current) flows through the primary windings 5a which are connected in series, the phase difference in the fundamental wave causes an unbalanced power condition. This causes an unbalanced current in the DC link side of the converter 6. As a result, a series connection cannot be made.

The primary windings 5a may be set up as a multi-transformer type, phase-shifting transformer. In this case, however, if phase shifting is performed on the primary side that handles a high voltage, the connection of the primary windings 5a which have insulation difficulty is complicated. Namely, the primary windings 5a have the complicated connection and insulation difficulty at the same time. Thus, the multi-transformer type, phase-shifting transformer cannot be adopted. The above-described problem remains to be solved. Therefore the static power system compensator apparatus suffers in economic and reliability point of view.

SUMMARY OF THE INVENTION

Accordingly, one object of the present invention is to provide a power system compensator apparatus and a power converter apparatus free from the above-discussed problems of the known power system compensator apparatus and power converter apparatus.

Another object of the present invention is to provide an economic and highly reliable power system compensator apparatus and power converter apparatus.

With the above objects in view, the power system compensator apparatus according to a first aspect of the present invention comprises: first power converter means for converting a power signal transmitted through a power transmission line in a power system and generating an output for working in a serial manner with respect to the power transmission line; and first control means for controlling the link voltage of the non-power system side of the first power converter means by controlling a phase of a fundamental wave of the power system.

According to a second aspect of the present invention, the first control means may perform phase-control with respect to a phase of a reference vector corresponding to a current vector of the power transmission line.

According to a third aspect of the present invention, the power system compensator apparatus may further comprise first transformer means disposed between the power transmission line and the power converter means and have a plurality of transformers working in series with the power transmission line, wherein each of the transformers has a phase difference between its primary and secondary windings.

According to a fourth aspect of the present invention, the first control means may comprise: a sensor portion for sensing a rotation angle of a reference vector that rotates in synchronism with a predetermined frequency of the power system according to a line current of the power transmission line, an adding/subtracting portion for performing addition and subtractions to a value of the rotation angle sensed by the sensor portion in accordance with the phase differences of the transformers; a vector rotating portion for rotating a vector by the angle generated by the adding/subtracting portion; a phase converter portion for phase-converting the output of the vector rotating portion so as to match the number of phases of the first transformer means; and a control signal generator portion for generating a control signal for controlling the first power converter means in response to the output of the phase converter portion.

According to a fifth aspect of the present invention, a power system compensator apparatus comprises: second power converter means for converting a power signal transmitted through a power transmission line in a power system and generating an output for working in a parallel manner with respect to the power transmission line; and second control means for controlling the link voltage of the non-power system side of the second power converter means by controlling a phase of a fundamental wave of the power system with respect to a phase of a reference vector corresponding to a voltage vector of the power transmission line.

The present invention also resides in a power converter apparatus comprising: power converter means for converting a power signal transmitted through a power transmission line in a power system, and generating an output for working on the power transmission line; and transformer means disposed between the power transmission line and the power converter means and having a plurality of transformers for working on the power transmission line; wherein the transformer means comprises a group of multi-phase transformers having a group of primary windings which are connected in series on a per-phase basis with the same phase current allowed to flow on the same phase connection, and a group of secondary windings which are magnetically coupled with the respective primary windings; and the power converter means comprises a group of static power converters that are connected with the group of secondary windings with phase differences set at the secondary windings.

BRIEF DESCRIPTION OF THE DRAWINGS

The present invention will become more readily apparent from the following detailed description of the preferred embodiments of the present invention taken in conjunction with the accompanying drawings, in which.

DESCRIPTION OF THE PREFERRED EMBODIMENTS

Embodiment 1

Figure 1:
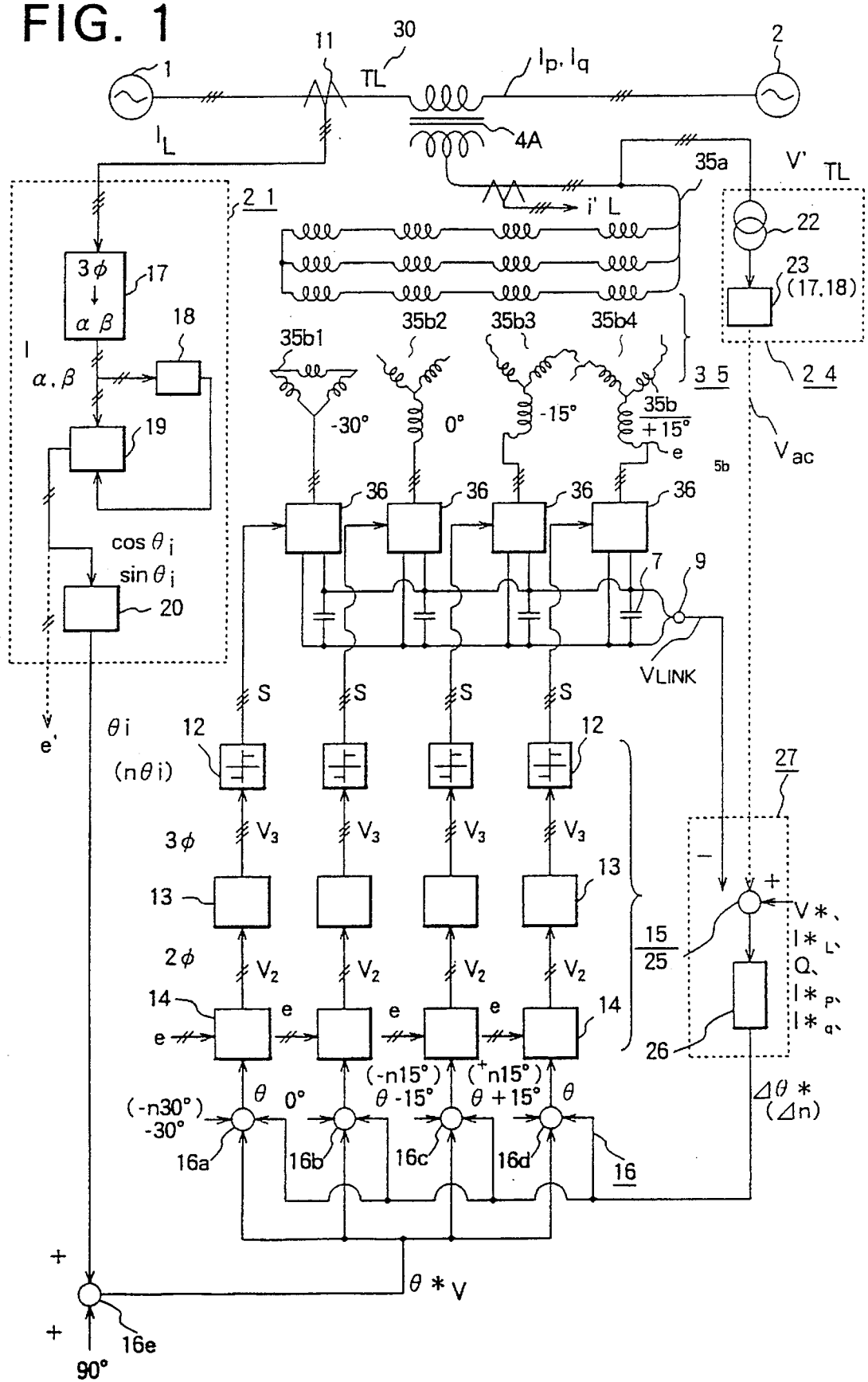
FIG. 1 is the schematic diagram of the power system compensator apparatus according to the first embodiment of the present invention.
Figure 3:
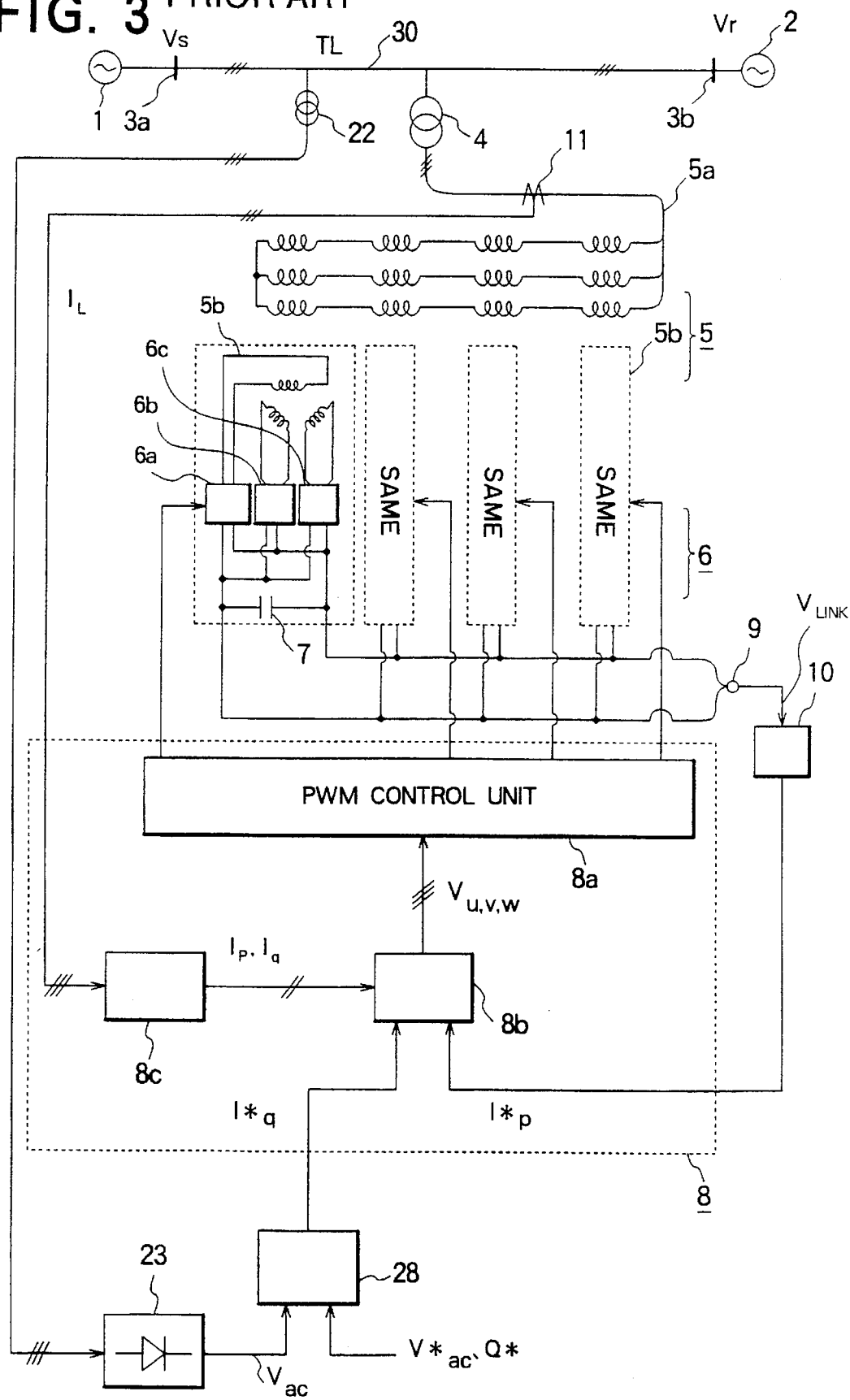
FIG. 3 is the schematic diagram of the privately known power system compensator apparatus.

FIG. 1 is the block diagram of the power system compensator apparatus according to the first embodiment of the present invention. Those components equivalent to those described with reference to the known apparatus in FIG. 3 are designated with the same reference numerals and their discussion is not repeated. In FIG. 1, multi-transformers 35 for use with a converter are composed of primary windings 35a and secondary windings 35b. As in the known apparatus in FIG. 3, the primary windings 35a are arranged with the winding segments of the multi-transformers 35 connected in series on a per-phase basis. On the secondary windings 35b at the converter side (low-voltage side), phase differences take place. Namely, the secondary windings 35b are arranged in the form of phase-shifting transformers for phase-shifting. The secondary windings 35b are constructed of a delta connection 35b1 and star connections (Y-connections) 35b2, 35b3 and 35b4 having phase differences −30°, 0°, −15°, +15°, respectively. Reference number 36 designates a power converter unit connected to each of the secondary windings 35b.

As described above, the multi-transformers 35 in this embodiment are arranged in the form of phase-shifting transformer in which the secondary windings 35b gives phase differences. The voltage phase difference and the current phase difference on each power converter unit 36 agree with each other as shown in FIG. 1. The power converter units 36 are thus equalized in their power factors and powers and are thus equalized in the currents in the DC link sides of the power converter units 36. This permits a direct connection of the DC link sides of the power converter units 36, improving DC system voltage. In this embodiment, the phase-shifting transformer design is employed. Phase is shifted on the secondary windings 35b at the static converter unit side, namely, at the low voltage side where insulation is easily assured. A complex connection is thus allowed with less insulation requirements, and the manufacturing process is simplified.

Reference numeral 15 designates switching control means 15 that control the switching sequence of the respective power converter units 36 (in three-phase system). The switching control means 15 includes a group of comparators or a group of code operational means 12, a group of 2-phase/3-phase converter means 13 and a group of vector rotating means 14. The number of each component matches the number of phases. Designated 4A is the main transformer that requires high-tension insulation as the main transformer 4 does in FIG. 3.

The operation of the group of comparators or code operational means 12, the group of 2-phase/3-phase converter means 13 and the group of vector rotating means 14 is now discussed.

The group of comparators or code operational means perform the operation, as expressed by the following equation (1), to each of the power converter units 36 on a unit-by-unit basis.

$$s = \begin{bmatrix} s_U \\ s_V \\ s_W \end{bmatrix} = \text{sign} \begin{bmatrix} v_{3U} \\ v_{3V} \\ v_{3W} \end{bmatrix} = \text{sign } v_3 \quad (1)$$

The group of 2-phase/3-phase converter means 13 perform the operation, as expressed by the following equation (2), to each of the power converter units 36 on a unit-by-unit basis.

$$v_3 = \begin{bmatrix} v_{3U} \\ v_{3V} \\ v_{3W} \end{bmatrix} = \begin{bmatrix} 1, & 0 \\ -1/2, & -\sqrt{3}/2 \\ -1/2, & \sqrt{3}/2 \end{bmatrix} \begin{bmatrix} v_{2\alpha} \\ v_{2\beta} \end{bmatrix} \quad (2)$$

The group of vector rotating means 14 perform the operation, as expressed by the following equation (3), to each of the power converter units 36 on a unit-by-unit basis.

$$v_2 = \begin{bmatrix} v_{2\alpha} \\ v_{2\beta} \end{bmatrix} = \begin{bmatrix} \cos\theta, & -\sin\theta \\ \sin\theta, & \cos\theta \end{bmatrix} \begin{bmatrix} e_d \\ e_q \end{bmatrix} \quad (3)$$

where $e = [e\ d, e\ q]^\tau$ may be any arbitrary unit vector such as $[1,0]^\tau$. Also acceptable is the unit vector multiplied by an arbitrary coefficient. Reference phase is determined by the vector e. (Symbol $[\ ]^\tau$ represents transposed vector.)

In FIG. 1, reference numerals 16a, 16b, 16c, 16d and 16e represent adding/subtracting means that perform addition and subtraction operations to the angle of rotation of vector and to phase. Designated 21 is angle-of-rotation sensor means for sensing the reference vector (unit vector) e' that rotates in synchronism with the predetermined frequency from the alternating system or the angle of rotation θi of the reference vector e'. The angle of rotation θi may be handled by numerals in this way. Furthermore, the angle of rotation θi may be handled by the number of pulses in a train (nθi). In this case, the vector rotating means 14 may comprises of a counter, and a sine and cosine function table. Since a PLL or a counter may be used as the angle-of-rotation sensor means for θi, reference vector operational method that handles the angle of rotation by numerals shown in FIG. 1 may be used in parallel. When the reference vector e' that rotates at the synchronization angular frequency is fed to the group of vector rotating means 14 as the reference vector e, the phase adding/subtracting means 16e does not need the angle of rotation θi sensed by the angle-of-rotation sensor means 21 because the reference vector e' is already rotated at the angle of rotation θi. As shown in FIG. 1, the angle-of-rotation sensor means 21 comprises of a 3-phase/2-phase converter block 17 for performing 3-phase to 2-phase conversion, an absolute value operational unit 18 for determining the absolute value to be described later based on the 2-phase output from the 3-phase/2-phase converter block 17, a divider block 19 for dividing the 2-phase output of the 3-phase/2-phase converter block 17 by the absolute value given by the absolute value operational unit 18, and an inverse trigonometric function operational unit 20 for computing inverse trigonometry of the output of the divider block 19.

The operation of the angle-of-rotation sensor means 21 is now discussed. The 3-phase/2-phase converter block 17 performs the operation, expressed by the following equation, using the line current vector $I_L=[i_R, i_S, i_T]^\tau$ sensed by the current pickup means 11. Alternatively, analog scheme or phase converter transformer may be employed as the 3-phase/2-phase converter block 17.

$$\begin{bmatrix} I_\alpha \\ I_\beta \end{bmatrix} = \begin{bmatrix} 2/3, & -1/3, & -1/3 \\ 0, & -1/\sqrt{3}, & 1/\sqrt{3} \end{bmatrix} \begin{bmatrix} i_R \\ i_S \\ i_T \end{bmatrix} \quad (4)$$

The absolute value operational unit 18 computes the absolute value $(I\alpha^2+I\beta^2)^{1/2}$. The divider block 19 divides each of Iα and Iβ by the absolute value provided by the absolute value operational unit I 8, and outputs the components cosθ i and sinθ i of the unit vector e'. The angle of rotation θ i is determined by computing inverse trigonometry of each component of the unit vector e'.

Based on the angle of rotation θi, the phase adding/subtracting means 16e adds 90° to the angle of rotation θi to determine a voltage phase θv, namely, generating an orthogonal voltage vector that leads by 90° the line current vector $I_L$ picked up by the current pickup means 11. The group of phase adding/subtracting means 16a~16d perform addition and subtraction operations to provide phase differences (−30°, 0°, −15°, +15°) on power converter units 36 respectively so that they match the phase differences of the multi-transformers 35. Next, the vector rotating means 14 rotates the unit vector [1,0] by the angle of rotation θi corresponding to each power converter unit 36 to obtain a vector $V_2$. On the other hand, when the reference vector e' that rotates at the synchronization angular frequency is fed to the vector rotating means 14 as the reference vector e, the angle of rotation θi is not fed to the phase adding/subtracting 16e. θv is given by phase change (90°). Namely, the group of the vector rotating means 14 rotate by the phase changes (60°, 75°, 90°, 105°) of the power converter units 36 the reference vector e' which has already been rotated by the electrical angle θi.

As a result, three-phase signal $V_3$ contains the fundamental wave of each phase in each of the power converter units 36, and switching signal s contains the switching signal corresponding to the fundamental wave of each phase in each of the power converter units 36. The switching signal s controls the switching element (not shown) in each of the power converter units 36. When the number of phases or arms of the power converter unit 36 is changed, equation (2) of the phase converter means 13 is also changed so that the equation (2) accommodates phases and the required number of phases. The number of power converter units 36 may be also changed.

In this embodiment, the output of the power converter unit 36 is connected in series with the transmission line (TL) 30 of the power system via the main transformer 4A. The voltage that is fed to the transmission line (TL) 30 in a series connection is to be controlled. At least PWM (pulse-width modulation) with variable pulse width is not performed, and thus the voltage needs adjusting separately. To this end, voltage control means 27 is provided in this embodiment. The voltage control means 27 controls the link voltage $V_{LINK}$ in response to a variable voltage command V*. The voltage control means 27 comprises a comparator block 25 for comparing the voltage command V* with the link voltage $V_{LINK}$, and a regulator block 26 constructed of a PID control device having a proper transfer function Gc.

The AC voltage of the power converter unit 36 of non-PWM or fixed pulse width ratio is proportional to the DC link voltage $V_{LINK}$ only. The DC link voltage $V_{LINK}$ is picked up by the link voltage pickup means 9 to be controlled in a feed-back manner. The variable voltage command V* (absolute value) is fed to the voltage control means 27. The comparator block 25 compares the voltage command V* with the link voltage $V_{LINK}$. The result of comparison is fed to the regulator 26 which has the proper transfer function Gc to obtain a phase variation command Δθ* that is common to all power converter units 36 (alternatively, when the angle-of-rotation sensor means 21 outputs pulses in train (nθi), corresponding pulse count (Δn) is obtained). The phase variation command Δθ* is fed to the phase adding/subtracting means 16a~16d (to 16e as necessary) to perform fine phase adjustment to the line current vector $I_L$.

As a result, a voltage component in phase with the line current vector $I_L$ is generated in the AC output side of the power converter unit 36 to adjust active power P and AC current. In other words, AC current flows at the AC output side of the power converter unit 36. The AC current is synchronously rectified by the switching function of the power converter unit 36 so as to be a DC current. The DC current is thus adjusted proportionally to the time-averaged value of the function expressed by s $I_L$. The DC current is charged in the link capacitor 7. As a result, the link voltage. $V_{LINK}$ is controlled. Furthermore, the amplitude or absolute value of the AC output voltage $V_{TL}$ is controlled. In this case, although most of the voltage vectors of the AC output voltage $V_{TL}$ are orthogonal to the current vector, small voltage components (in phase with current) corresponding to the loss in the power converter unit 36 appear.

Since the link voltage $V_{LINK}$ is proportional to the AC voltage $V_{TL}$, AC voltage pickup means 24 may be used to pick up the AC voltage $V_{TL}$ or the absolute value Vac of the value $V'_{TL}$. that is proportional to the AC voltage $V_{TL}$ (for example, the primary voltage of the converter transformer 35) in order to feed back the AC voltage $V_{TL}$ or the absolute value Vac. As in the known apparatus shown in FIG. 3, the AC voltage pickup means 24 may comprises the AC voltage pickup means 22 and the absolute value pickup means 23 having a rectiiier and the like. Alternatively, the absolute value pickup means 23 may be replaced with the 2-phase/3-phase converter means 17 and the absolute value operational means 18. In this case, the picked up voltage is phase converted from 2-phase to 3-phase, and then subjected to absolute value computation.

In the above embodiment, power conversion is non-PWM system. Furthermore, voltage control may be performed by controlling phase when the power converter unit 36 is operated on a fixed pulse width ratio of a minimum number of pulse count (for example, 3 pulses or less).

The power converter unit 36 serves as first power converter means which converts power transmitted via the transmission line (TL) 30 in the power system, and the output thereof works in series with the transmission line 30 via the main transformer 4A. The switching control means 15 serves as first control means which controls the link voltage of the non-power system side of the power converter means (alternatively, the AC voltage of the power system side that reflects the link voltage of the non-power system side or the slave variable of the AC voltage of the power system side), by controlling the phase of, at least, the fundamental wave of the power system. The multi-transformers 35 serve as first transformer means disposed between the power converter means and the transmission line 30 and constructed of the plurality of transformers working in series with the transmission line 30.

The sensor means 21 constitutes a sensor portion which senses the angle of rotation of the reference vector that rotates at the predetermined frequency of the power system based on the line current of the power system. The phase adding/subtracting means 16a~16e constitute an adding/subtracting portion that performs addition and subtraction operations to the angle-of-rotation values sensed by the sensor portion, correspondingly to the phase differences of the plurality of transformers. The group of vector rotating means 14 constitutes a vector rotating portion that rotates vector by the angle provided from the adding/subtracting portion. The group of 2-phase/3-phase converter means 13 constitutes a phase converter portion that phase-converts the output from the vector rotating portion in accordance with the number of phases of the transformer means. The group of comparators or code operational means 12 constitutes a control signal generator portion that generates the control signal for controlling the power converter means based on the output of the phase converter means.

Also, the power converter unit 36 and the multi-transformers 35 constitute a power converter apparatus of the present invention.

In this embodiment, as described above, the power system compensator apparatus comprises the power converter unit 36 that works in a serial manner with the power transmission line (TL) 30 that tansmits power, and control means 15 for controlling the link voltage ($V_{LINK}$) of the non-power system side of the power converter unit 36 (or the power system AC voltage (Vac) or its slave variable that reflects the link voltage of the non-power system side). The control means 15 controls at least the phase of the fundamental wave of the power system. Thus, the power converter unit 36 is thus allowed to operate in either non-PWM or fixed pulse width having a minimum number of pulses, and the switching rate is minimized. In particular, in the non-PWM, one switching element performs one switching operation per cycle. Therefore, switching loss and snubber loss are lowered and efficiency is increased. Phase addition or subtraction operations perform most of the control process in the apparatus by using vector rotation technique. Thus, control is simplified.

This embodiment thus offers performance and economic improvements in the apparatus. Since the output voltage of the static power converter unit 36 is inserted in series with the transmission line, a level convenience is substantially improved in direct control of the line current and direct compensation control of the reactance voltage. The power system compensator apparatus according to the present invention thus offers substantial advantage in compensation control and reliability control.

Embodiment 2

Figure 2:
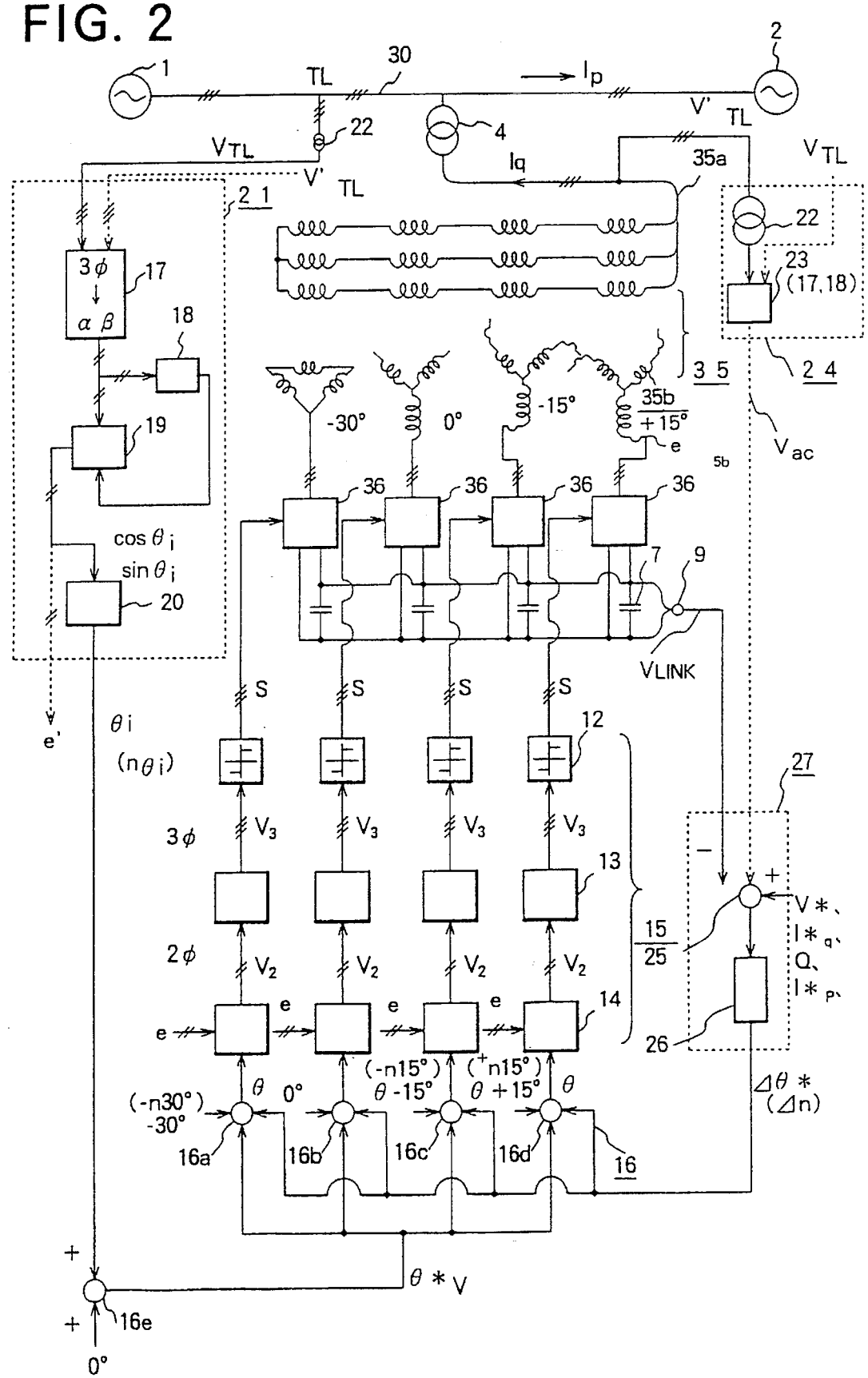
FIG. 2 is the schematic diagram of the power system compensator apparatus according to the second embodiment of the present invention.

FIG. 2 shows the second embodiment of the present invention. This embodiment presents a parallel compensation method, in which the main transformer 4 is connected in parallel with the transmission line (TL) 30. In this embodiment, the AC voltage pickup means 22 is disposed between the angle-of-rotation means 21 and the transmission line (TL) 30 so as to pick up the line AC voltage $V_{TL}$. The rest of the construction of this embodiment remains unchanged from that of the first embodiment. Those components equivalent to those described with reference to the embodiment 1 are designated with the same reference numerals and their explanation is not repeated. In this embodiment, the power converter unit 36 serves as second power converter means which converts power transmitted via the transmission line (TL) 30 in the power system, and the output of the power converter unit 36 works in parallel with the transmission line 30 via the main transformer 4. The control means 15 serves as second control means for controlling the link voltage of the non-power system side of the second power converter means by controlling a phase of a fundamental wave of the power system with respect to a phase of the reference vector corresponding to a voltage vector of the power transmission line.

In this embodiment, the reference vector e' or its angle of rotation θi is detected or computed by using the AC line voltage vector $V_{TL}$ or $V'_{TL}$ that is proportional to $V_{TL}$ (for example, the primary voltage of the converter transformer 35) as a reference. The phase of the AC output voltage of each power converter unit 36 is controlled with respect to the line voltage $V_{TL}$. Let Δθ represent a phase difference. The active power P of the power converter unit 36 is proportional to $\sin\Delta\theta$. Therefore, the output $\Delta\theta^*$ of the voltage control means 27 controls the active power P, thereby controlling the DC current of the power converter unit 36. Furthermore, the link voltage $V_{LINK}$ and the AC output voltage of the power converter unit 36 are also controlled.

Since power that enters the power converter unit 36 corresponds to the loss, the steady value of $\Delta\theta$ is marginal. Namely, in steady state, the AC output voltage of the power converter unit 36 works substantially in phase with the line voltage $V_{TL}$. To vary the voltage, $\Delta\theta^*$ is transiently changed so as to change the active power P, and thereby to change the link voltage $V_{LINK}$ and AC output voltage. Controlling substantially in-phase AC output voltage allows reactive current Iq or reactive power Q to be controlled, and is thus utilized in compensation control and reliability control of the power system.

If another DC system is connected to the DC link side, the active power P is controlled by changing $\Delta\theta^*$. In the phase-shifting transformer method, as already described, power and DC current are balanced between the power converter units 36. By fine controlling phase input with respect to each power control unit 36, DC current and DC voltage are controlled on an individual basis or balanced basis. The DC link side thus allows a series connection. The method in which DC current and DC voltage are controlled on an individual basis or balanced basis by fine controlling phase input with respect to the power control unit 36 may be applied to the embodiment 1. In this way, phase and voltage controls may be performed on an individual basis rather than on a group basis.

In this embodiment, the static power converter unit 36 comprises of a DC link type AC/DC converter such as an inverter. The present invention is not limited to this. An AC link type (high-frequency AC link type, in particular) static power converter (cycloconverter and matrix converter) may be acceptable. In this case, an AC capacitor is substituted for the link capacitor 7, and the AC link rather than the DC link $V_{LINK}$ is controlled. Furthermore, a polyphase such as a three-phase may be used. Since the link voltage is controlled by controlling the phase difference $\Delta\theta$ and active power P that is slave to $\Delta\theta^*$, the control method in the above embodiment is applicable.

In the preceding embodiments, controlling the voltage that is fed back by controlling phase in response to the voltage control means 27 has been discussed. Another variable that is slave to the voltage may be set to be a command and another slave variable may be feedback controlled. For example, in the first embodiment in FIG. 1, line current control means may be employed by feeding back the line current $I_L$ or a variable $I_L'$ corresponding to $I_L$ and by providing a command $I^*_L$. Furthermore, control means for reactive power that is inserted in series and control means for controlling variables to be slave controlled, such as active and reactive power flows may be employed. In the second embodiment, feedback control means for active current Ip, reactive current Iq, active power P and reactive power Q may be employed. Furthermore, line active current and active power flow may be controlled slave to voltage, and control means for these slave variables may be employed. Furthermore, these means may be employed in slave control relation.

As has been described above, according to the first aspect of the present invention, the power system compensator apparatus comprises the power converter means that works in a serial manner with the power transmission line that transmits power, and control means for controlling the link voltage ($V_{LINK}$) of the non-power system side of the power converter means (or the power system AC voltage (Vac) or its slave variable that reflects the link voltage of the non-power system side). The control means controls the phase of, at least, the fundamental wave of the power system. The static power converter as the power converter means is thus allowed to operate in either non-PWM or fixed pulse width ratio, and its switching rate is minimized. Loss is lowered and running cost is minimized. Since the voltage that works in series with the transmission line is controlled, direct compensation for system reactance voltage and direct control and stabilization of the transmission line current and power flow are achieved. Improved performance thus results.

According to the second aspect of the present invention, the control means performs phase control with respect to the phase of the reference vector corresponding to the current vector of the transmission line. Thus, the link voltage is properly controlled. Voltage control performance and another control performance slave to the voltage control performance are substantially improved.

According to the third aspect of the present invention, transformer means made up of the plurality of transformers working in series with the transmission line is disposed between the transmission line and the power converter means, and each transformer has a phase difference between its primary and secondary windings. This arrangement not only reduces the output voltage harmonics in the converter means, but line current harmonics with the reactance of the power transmission system working in series.

According to the fourth aspect of the present invention, the control means, comprising vector rotating block, performs phase control by allowing the adder/subtracter to perform addition or subtraction operation to the input angle to the vector rotating block. Control is thus simplified, and reliability and economy of operation are improved.

According to the fifth aspect of the present invention, the power system compensator apparatus comprises power converter means which works in a parallel manner with the transmission line and control means for controlling the link voltage ($V_{LINK}$) Of the non-power system side of the power converter means (or the power system AC voltage (Vac) that reflects the link voltage of the non-power system side or the slave variable of the power system AC voltage). The control means controls the phase of, at least, the fundamental wave of the power system. The control means also performs phase control with respect to the phase of the reference vector corresponding to the voltage vector of the transmission line. Therefore, the static power converter of the parallel comparator is operated in either non-PWM or fixed pulse width ratio. Switching rate is minimized, alleviating resulting loss in the apparatus. Improved economy of operation results. In the parallel type compensator, the control means, comprising vector rotating block, performs phase control by allowing the adder/subtracter to perform addition or subtraction operations to the input angle to the vector rotating block. Control is thus simplified, and reliability and economy of operation are improved.

Also, in the the power converter apparatus of the present invention, the static power converter contains phase-shifting transformers with phase differences presented by their windings at the converter side. A complicated wiring required for phase-shifting is made on the winding side where insulation is easily assured. This arrangement takes full advantage of the phase-shifting transformer and accommodates series connection at the non-power system side (link side). Improved performance thus results.

What is claimed is:

1. A power system compensator apparatus comprising:

first power converter means for converting a power transmitted through a power transmission line in a power system and generating an output, said power converter means including a plurality of power converter units; and first control means for controlling a link voltage of the non-power system side of said first power converter means by controlling a phase in relation to a phase of a fundamental wave of said power system and by generating a phase difference between each of the plurality of power converter units.

2. The power system compensator apparatus according to claim 1, wherein said first control means performs fundamental wave phase-control with respect to a phase of a reference vector corresponding to a current vector of said power transmission line.

3. The power system compensator apparatus according to claim 1, comprising first transformer means disposed between said power transmission line and said power converter means and having a plurality of transformers for working in series with said power transmission line, wherein each of said transformers has a phase difference between its primary and secondary windings.

4. A power system compensator apparatus comprising:

first power converter means for converting a power transmitted from a power transmission line in a power system and generating an output for working in a serial manner with respect to said power transmission line;

first transformer means disposed between the power transmission line and said first power converter means and having a plurality of transformers for working in series with the power transmission line, wherein each of the transformers has a phase difference between its primary and secondary windings; and first control means for controlling a link voltage of the non-power system side of said first power converter means by controlling a phase in relation to a phase of a fundamental wave of said power system, said first control means comprising:

a sensor portion for sensing a rotation angle of a reference vector that rotates in synchronism with a predetermined frequency of said power system according to a line current of said power transmission line;

an adding/subtracting portion for performing addition and subtractions to a value of said rotation angle sensed by said sensor portion in accordance with said phase differences of said transformers;

a vector rotating portion for rotating a vector by the angle generated by said adding/subtracting portion;

a phase converter portion for phase-converting the output of said vector rotating portion so as to match the number of phases of said first transformer means; and a control signal generator portion for generating a control signal for controlling said first power converter means in response to the output of said phase converter portion.

5. A power converter apparatus comprising:

power converter means for converting a power transmitted through a power transmission line in a power system, and generating an output for working on said power transmission line; and transformer means disposed between said power transmission line and said power converter means and having a plurality of transformers for working on said power transmission line; wherein said transformer means comprises a group of multi-phase transformers having a group of primary windings which are connected in series on a per-phase basis with the same phase current allowed to flow on the same phase connection, and a group of secondary windings which are magnetically coupled with said respective primary windings; and said power converter means comprises a group of static power converters that are connected with said group of secondary windings with phase differences set at said secondary windings.

6. The power system compensator apparatus according to claim 4 further comprising a main transformer connected in series to the transmission line, said first transformer means being coupled to said main transformer.

7. The power system compensator apparatus of claim 4 further comprising a main transformer connected in parallel to the transmission line, said first transformer means being coupled to said main transformer.

* * * * *